J. COOK.
CAN COOKER.
APPLICATION FILED JUNE 19, 1909.
942,812.
Patented Dec. 7, 1909.
2 SHEETS—SHEET 1.
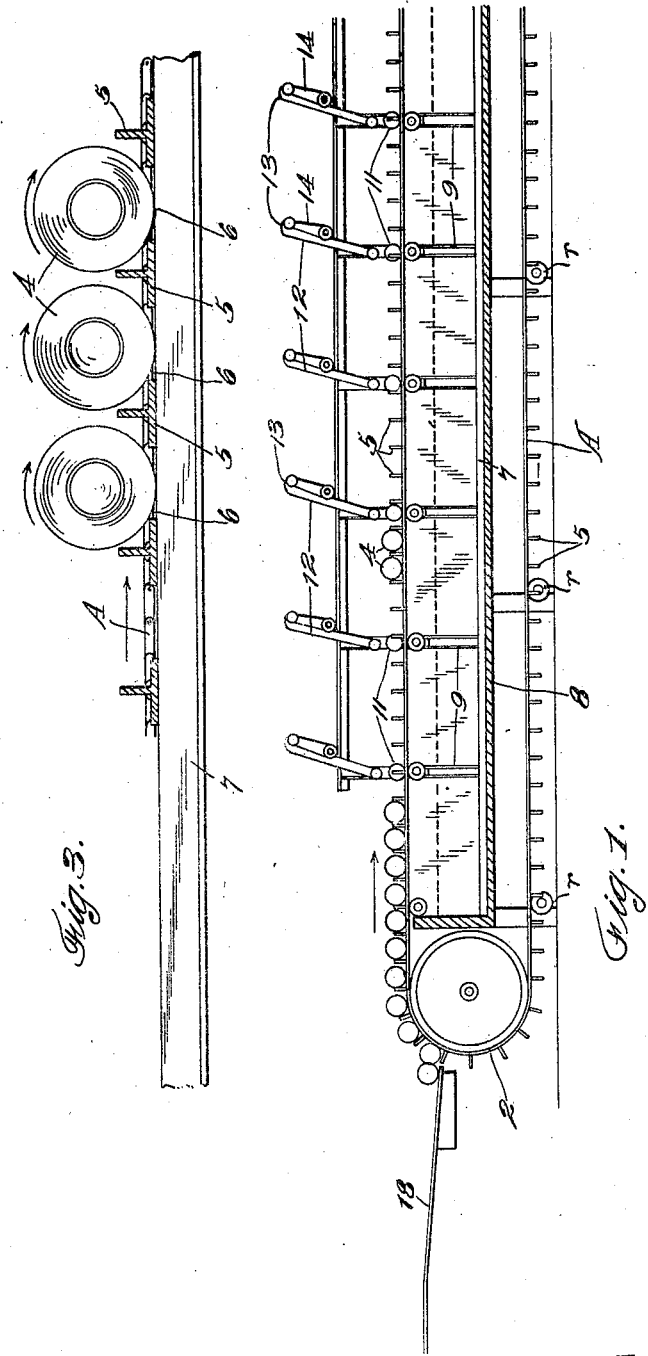
Witnesses:
F. E. Maynard
T. Castberg
Inventor;
John Cook,
By Geo. L. Strong,
his Atty.

J. COOK.
CAN COOKER.
APPLICATION FILED JUNE 19, 1909.
942,812.
Patented Dec. 7, 1909.
2 SHEETS—SHEET 2.
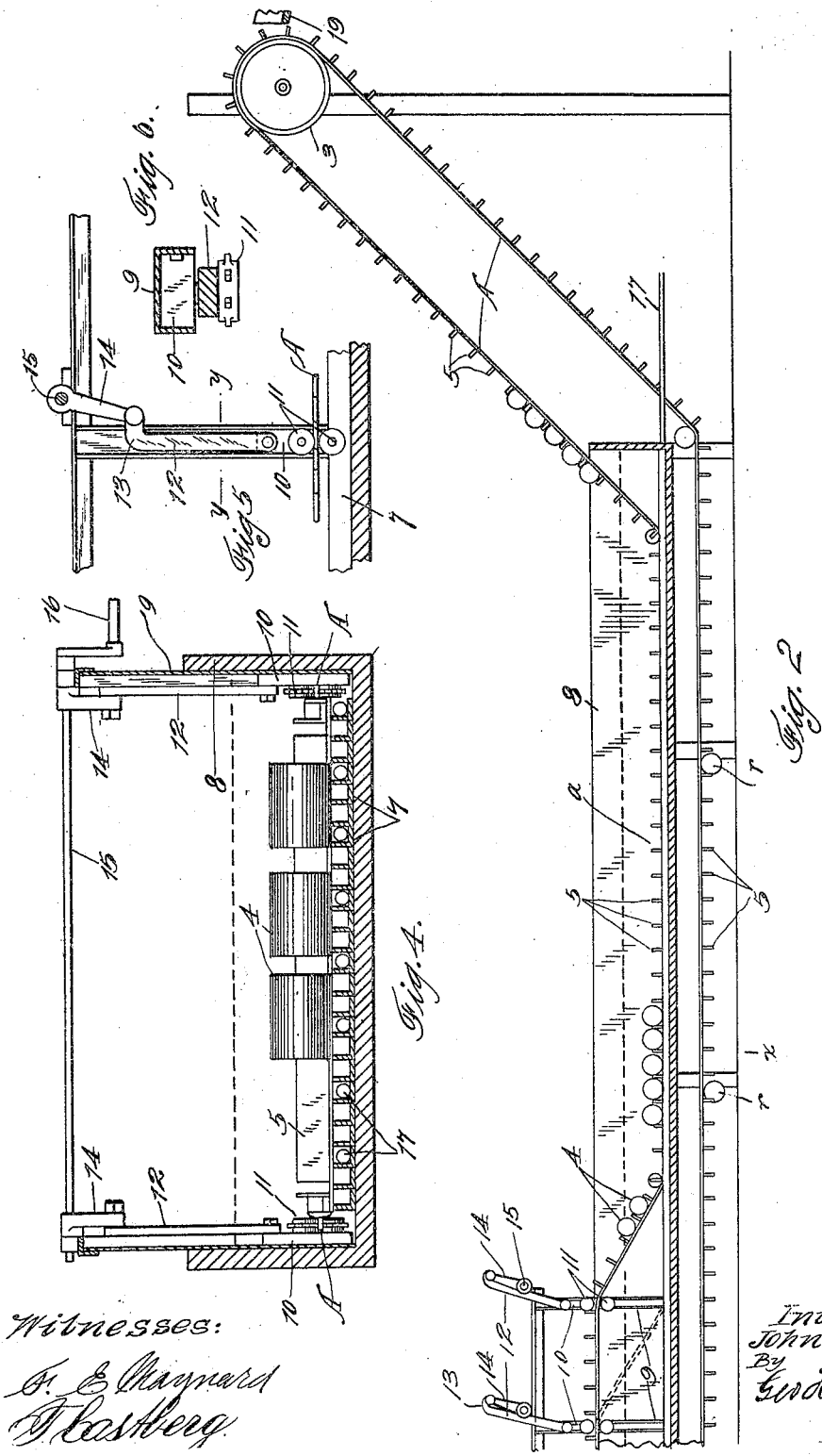
Witnesses:
F. E. Maynard
T. Fastberg
Inventor;
John Cook;
By Geo. H. Strong
his Atty.

UNITED STATES PATENT OFFICE.

JOHN COOK, OF WEST BERKELEY, CALIFORNIA.

CAN-COOKER.

942,812.

Specification of Letters Patent.

Patented Dec. 7, 1909.

Application filed June 19, 1909. Serial No. 503,178.

*To all whom it may concern:*

Be it known that I, JOHN COOK, citizen of the United States, residing at West Berkeley, in the county of Alameda and State of California, have invented new and useful Improvements in Can-Cookers, of which the following is a specification.

My invention relates to apparatus for cooking the contents of sealed cans.

The object of the invention is to provide a simple, practical apparatus which will be continuous in operation, which will keep the cans turning over during the cooking operation, and which is readily adjustable to any desired length of cooking period. That is to say, by this invention I am able to adapt it to cook the cans for five minutes, or ten minutes, or any other suitable period, according to the nature or condition of the goods undergoing treatment.

Having reference to the accompanying drawings—Figure 1 is a side elevation and part section of a portion of a machine embodying my invention. Fig. 2 is a similar view of the remaining portion of said machine. Fig. 3 is a detail and side elevation showing the manner of supporting the cans to make them roll while passing through the cooking bath. Fig. 4 is a cross-section on X—X, Fig. 2. Fig. 5 is a detail of the carrier adjusting means. Fig. 6 is a section on Y—Y, Fig. 5.

In the embodiment of the invention I employ an endless carrier A of any suitable length and width mounted on an appropriate framework to travel around the end sprockets 2—3. This carrier has its lower run supported upon suitable rollers $r$ and is preferably constructed in a special manner, as here shown, and consists of a series of crosswise extending inverted T-bars 5 secured to the belts or chains A and suitably spaced apart to accommodate the cans 4 and provide intervening slots 6 through which the cans may protrude and may be supported and roll on the angle-iron flooring 7, Fig. 4, in the bottom of the tank 8 when the carrier is allowed to be submerged into the tank, as shown at $a$, Fig. 2. This angle-iron flooring 7 extends the length of the tank and the carrier slides over it when the carrier is submerged. The spaces or slots 6 between the successive T-bars 5 are such that the cans will be easily accommodated without any possibility of jamming at any point of the apparatus. The carrier A is operated continuously and at suitable speed by any appropriate means.

The cooking of the cans is done by passing the cans through hot water contained in a suitable tank 8, but the upper portion of the carrier is adapted to have only an amount of its length submerged, according to the period of time to which the different articles may be subjected to the cooking medium. In order to regulate this period of time to which the different articles may be subjected to the cooking medium I employ the following means: Extending along the tank from one end thereon, preferably the feed end, as here shown, are a series of standards or uprights 9 arranged in pairs on opposite sides of the tank, these standards here being shown of channel form, Fig. 6. Sliding in each of these channeled standards is a block 10 carrying a pair of rollers 11, between which the carrier chain A passes. There is one block 10 on each side of the tank for each pair of standards, so as to support equally both sides of the carrier. The top of each block has pivoted to it a link 12 which is cranked, as shown, at its upper end, at 13, and this cranked end of the link 12 is connected to a crank-arm 14 on a rock-shaft 15, which rock-shaft is journaled with respect to a pair of standards and extends across the machine; each rock-shaft being operated by a suitable crank handle 16. The length of throw of the crank-arm 14 is such that when the parts are in the position shown in Fig. 5, the carrier will rest in the bottom of the tank and the cans on the carrier will be submerged in the hot liquid therein. If the handle 16 is turned through a half revolution, a pair of blocks will be lifted, carrying up with them the chain and raising it clear of the liquid in the tank; the cranked off-set 13 passing over the center of the shaft 15 when the parts are lifted as just described, and forming an automatic lock to hold up the carrier. This elevated position of the carrier is represented in Fig. 1, and at the extreme left of Fig. 2.

The chain is of sufficient length that always a part of it will be traveling through the heating liquid in the tank. Passing out of the tank at the opposite end from which the cans are fed, the carrier travels up an incline around the end sprocket 3, thence down beneath the tank to the point of beginning again.

In Figs. 1 and 2, taken collectively, the apparatus is shown as set for the shortest period of cooking.

The standards 9 are spaced apart commensurate with the speed of travel, or conversely, the speed of travel of the belt is regulated according to the distance between the successive pairs of standards 9, so that if any set of rollers 11 of a forward pair of standards is dropped so as to let a greater length of belt run through the water, then the cooking period will be increased a certain definite length of time, say five minutes.

The heating of the water in the tank may be effected by running steam pipes 17 through the channels formed by the angles 7, Fig. 4.

In operation, the machine is set so that a definite portion of the carrier will be submerged, according to the desired period of time to which the article is to be subjected to the cooking medium. The cans are fed in from any suitable source of supply, as from the runway 18, and are picked up by the successive cross flanges of the inverted T-bars 5. The machine may be made of any size and width so that several rows of cans may be run through the apparatus at one time, as indicated at Fig. 4. The period of time to which the article may be subjected to the cooking medium is regulated by dropping one or more pairs of blocks 10 adjacent to the point of submergence. For articles requiring but a limited cooking, all the blocks 10 are raised, as shown in the collective views, Figs. 1 and 2. If the article is to be subjected to the cooking medium for a longer period of time, the front set of blocks is dropped by simply swinging over the front crank handle 16 so as to drop that section of the chain. If a still longer period of cooking is desired, it may be secured by a similar operation on the next succeeding set of blocks; or several pairs of blocks, if necessary, may be dropped, if a very long period of cooking is required.

That portion of the carrier which is above the liquid, and which carries the uncooked cans, is supported only by the rollers 11, these successive rollers being so spaced apart that the portion of the carrier which sags within the tank, and represented at $a$, Fig. 2, will operate to maintain the upper unsubmerged part of the carrier taut at all times; the T-bars being so positioned that they will not bind on the cans. During this upper part of the travel of the cans, the latter are supported on the base flanges of these inverted T-bars and depend slightly through the slots 6 formed between the adjacent cross-bars. The submerged part of the carrier slides along on the angle-bar flooring 7, and during this part of the travel the cans are lifted enough out of the slots 6, being supported on the angle 7, and are pushed forward by the T-bar behind and are made to roll. It is this continuous rolling motion of the cans during the cooking that is one important feature of the invention.

The cans on rising out of the liquid and traveling up the incline at the right of Fig. 2, have a chance to cool, and they are shunted off, at 19, from the carrier to any suitable point of delivery.

While I have shown a hot water tank for cooking the cans, it is manifest that any other cooking or heating means may be employed, and which would be applicable in the arrangement here shown; the essential feature of the invention being the means for raising and lowering the sections of the chain so as to vary the period of time to which the different articles may be subjected to the cooking medium, and making the cans roll during the cooking operation.

Having thus described my invention, what I claim and desire to secure by Letters Patent is—

1. A can-cooker comprising an endless chain, a heating tank, means for supporting the chain to permit a portion of it to be submerged in the tank, and means for varying the submerged length of the chain, said chain provided with can-carrying means.

2. In a can-cooker, the combination of a heating tank, a can-carrier suitably supported and having a portion submerged in the tank, and means for raising and lowering portions of the carrier to vary the submerged length thereof.

3. In a can-cooker, the combination of a heating tank, a can-carrier suitably supported and having a portion submerged in the tank, and means for raising and lowering portions of the carrier to vary the submerged length thereof, said raising and lowering means comprising vertically sliding supports for the carrier, and means for effecting the raising and lowering of said supports.

4. In a can-cooker, the combination of a heating tank, an endless carrier having a can-carrying portion submerged in the tank, the opposite sides of the carrier being supported above the tank on adjustable rollers, and means for adjusting said rollers to vary the submerged length of said carrier.

5. In a can-cooker, the combination of a heating tank, an endless carrier having a can-carrying portion submerged in the tank, the opposite sides of the carrier being supported above the tank on adjustable rollers, and means for adjusting said rollers to vary the submerged length of said carrier, said rollers being mounted on blocks sliding in vertical standards, and said blocks operative in pairs.

6. A can-cooker comprising a cooking tank, an endless can-carrier having a portion submerged therein, a series of uprights at opposite sides of the tank, carrier-supporting rollers sliding on said uprights, and means for raising and lowering the rollers to vary the submerged length of the carrier.

7. The combination of an endless can-carrier passing over end sprockets, and intermediate supporting means for the carrier, said supporting means comprising opposed standards, blocks slidable on said standards, rollers on the blocks engaging and supporting the edges of the carrier, and means for raising and lowering the blocks to vary the submerged length of the carriers.

8. The combination of a cooking tank, an endless carrier having a portion dipping thereinto, the carrier supported on end sprockets, intermediate sprockets or rollers supporting the portion of the carrier above the tank, and means for raising and lowering the intermediate sprockets to submerge more or less of the carrier.

9. The combination of a cooking tank, an endless carrier having a portion dipping thereinto, the carrier supported on end sprockets, intermediate sprockets or rollers supporting the portion of the carrier above the tank, and means for raising and lowering the intermediate sprockets to submerge more or less of the carrier, said endless carrier including crosswise extending, inverted T-shaped bars suitably spaced apart to allow a can partly to depend therethrough and partly support the can.

10. The combination of a cooking tank, an endless carrier having a portion dipping thereinto, the carrier supported on end sprockets, intermediate sprockets or rollers supporting the portion of the carrier above the tank, means for raising and lowering the intermediate sprockets to submerge more or less of the carrier, said endless carrier including crosswise extending, inverted T-shaped bars suitably spaced apart to allow a can partly to depend therethrough partly support the can, and a flooring in the tank on which the cans partially rest and over which they are made to roll when the cans are traveling through the tank.

11. The combination of a cooking tank, an endless carrier having a portion dipping thereinto, the carrier supported on end sprockets, intermediate sprockets or rollers supporting the portion of the carrier above the tank, means for raising and lowering the intermediate sprockets to submerge more or less of the carrier, and means to cause the cans to roll while passing through the tank.

12. The combination of a cooking tank, an endless carrier having a portion dipping thereinto, the carrier supported on end sprockets, intermediate sprockets or rollers supporting the portion of the carrier above the tank, and means for raising and lowering the intermediate sprockets to submerge more or less of the carrier, said means for raising and lowering said intermediate rollers comprising sliding blocks arranged in pairs on opposite sides of the tank, and for operating the blocks of a pair in unison. crank and link connections with the blocks In testimony whereof I have hereunto set my hand in presence of two subscribing witnesses.

JOHN COOK.

Witnesses:
T. H. FALLON,
J. T. WATERS.